Dec. 14, 1943.   M. R. HATFIELD   2,336,542
METHOD OF TREATING EMULSIONS
Filed Sept. 24, 1940
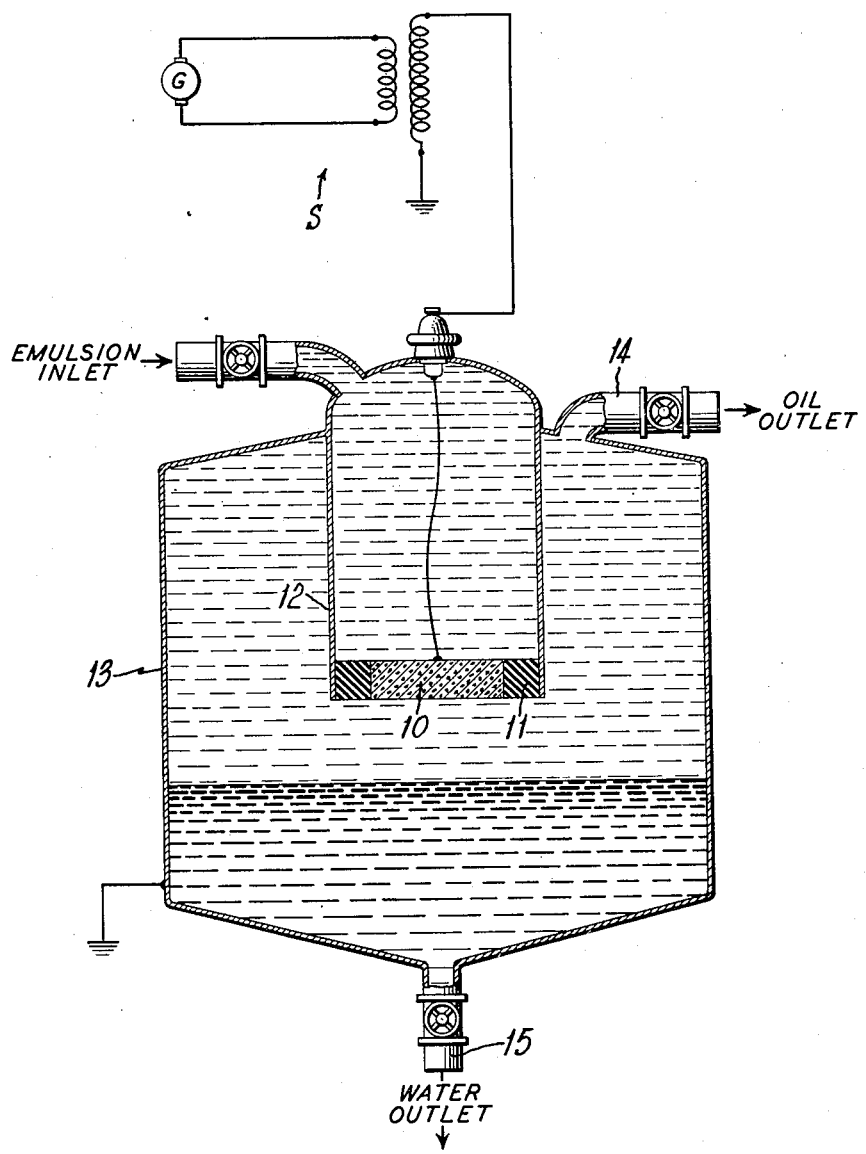
INVENTOR
MARCUS R. HATFIELD
BY
ATTORNEY Patented Dec. 14, 1943

2,336,542

UNITED STATES PATENT OFFICE 2,336,542

METHOD OF TREATING EMULSIONS

Marcus R. Hatfield, Lakewood, Ohio, assignor to National Carbon Company, Inc., a corporation of New York Application September 24, 1940, Serial No. 358,087

5 Claims. (Cl. 204—188)

This invention relates to emulsions, and more particularly to the problem of resolving emulsions.

One of the more important, as well as more difficult, problems of emulsion resolution is encountered in the handling of crude petroleum. According to G. B. Shea, U. S. Bureau of Mines Bulletin 417, (1939), "Emulsions of water and oil always have constituted one of the most serious forms of waste in the oil fields, and the necessity of dehydrating emulsified crude petroleum to obtain marketable or pipe-line oil confronts operators in many fields with a major operating problem." Emulsions of water in oil form in wells and in the mechanical appliances used for production, or in the flow lines above ground. Some oil desalting processes involve a deliberate emulsification of added water to effect a thorough washing of the oil, and in such processes the successful removal of salt depends upon the successful resolving of the emulsion (cf. L. F. Christianson and J. W. Horne, U. S. Bureau of Mines, Report of Investigations No. 3422, October, 1938).

Gravity settling, sometimes assisted by heat and enough pressure to prevent the escape of volatile constituents at the temperature used, will resolve "loose" or unstable emulsions. Settling is a slow and inefficient method, unsuited for the resolution of "tight" emulsions of high stability. Centrifugal settling is more rapid than gravity settling, but it does not resolve very stable emulsions.

The speed and efficiency of settling may be materially enhanced by adding to the emulsion a chemical which tends to break it. Many such chemicals have been used, with some success. Intimate contact of the emulsion with a solid, effected either by mixing the solid with the emulsion or by filtering the emulsion through the solid, also breaks the emulsion to a limited extent and to that extent hastens settling. Another method of breaking the emulsion comprises passing the emulsion over an electrode which is charged with electricity at a high voltage, usually between 5,000 and 35,000 volts, although voltages as high as 200,000 have been proposed.

No rapid, inexpensive method has been devised for completely resolving tight emulsions of water in crude petroleum. One object of this invention is to provide a novel and improved method for resolving emulsions, including emulsions of water in crude petroleum, rapidly, inexpensively, and more thoroughly than has been attainable in practice by previously proposed methods. Another object is to provide a novel apparatus adapted for use in carrying out the method of the invention.

The method of the invention comprises, in its broader aspect, passing an emulsion through a finely porous mass of electrically conductive material, preferably of carbon and applying to the conductive mass electricity at a high voltage. After such treatment, even a tight or stable emulsion separates rapidly and almost completely. The method may suitably be carried out in an apparatus which, in accordance with this invention, comprises a porous mass of electrically conductive material suitably supported in a settling chamber, a source of electricity at high voltage connected to said mass, means for feeding an emulsion to and through the mass into the settling chamber, and means for separately withdrawing from the settling chamber the resolved constituents of the emulsion.

In describing the invention more particularly, reference will be made to the accompanying drawing, wherein the sole figure is a cross-section of a typical apparatus embodying the invention, the legends also serving to illustrate the flow of materials during the practice of the method of the invention.

The illustrated apparatus of the invention comprises a porous mass 10 of electrically-conductive material supported within, but separated by electrical insulation 11 from, an emulsion conduit 12 which discharges treated emulsion well within a settling tank 13 wherein the constituents of the emulsion separate by gravity. To the porous mass 10 of conductive material there is connected a source S of high-voltage electricity, suitably an alternating current generator and a transformer, as shown, although a direct current source may be used. Outlet conduits 14 and 15 are connected respectively to the top and bottom of the settling tank 13 for the separate removal of the separated constituents of the emulsion.

The method and apparatus may be operated at voltages (applied to the porous mass 10) over a wide range, say between 5,000 and 200,000 volts. The optimum voltage to be applied depends to a considerable extent on the type of emulsion being treated. About 25,000 volts is satisfactory for the treatment of a tight emulsion of water in crude petroleum.

Although the porous mass 10 of electrically conductive material may be made from any of a wide variety of such materials, for instance porous copper, nickel, lead, or other metal, or an alloy, I prefer that it consist of carbon. The carbon may be any of the commercial forms of carbon, including coal coke, petroleum coke, lampblack, charcoal, various activated carbons, and natural or artificial graphite. A self-supporting mass, such as may be formed by agglomeration, bonding, or, in the case of some metals, sintering, is preferred although under some circumstances a loose unagglomerated mass will be useful. The mass should be uniformly and finely porous, the pores consisting of a multitude of small, tortuous passages which are fairly uniform in diameter and in distribution. A preferred material is that described, for instance, by L. C. Werking in "Fabricated Porous Carbon," Trans. The Electrochemical Soc., vol. 74, p. 365 (1938).

In general, the smaller the pore size of the porous mass 10, and the greater its thickness, the greater will be its resolving power for stable emulsions, but the maintenance of economically practical rates of flow of emulsion at reasonable pressure heads limits both the pore fineness and the thickness of the mass. If the emulsion contains suspended finely divided solids, the pore size of the mass should be great enough to permit the free passage of those solids. For the treatment of emulsions of water in crude petroleum, a one-inch thick mass of porous graphite or carbon of the "Grade 20" described by L. C. Werking in the article just mentioned has been found to be particularly satisfactory. This material comprises essentially a mass of carefully sized solid carbon particles, bonded with porous carbon to form a rigid, uniformly porous material in which the pores are interconnected in all directions. The length of the pore passages is very great in relation to their diameters, the diameters being on the average less than 0.05 mm. in diameter.

The effectiveness of the method of this invention is not only greater than that of either of the two processes of filtering or electrical resolution, it is also far greater than a mere tandem combination of these two methods. For instance three portions of a tight emulsion of water in Illinois crude petroleum, containing about 25% water by volume were treated separately at room temperature by filtering, by electrical resolution, and by the method of the invention.

In the filtering treatment, the emulsion sample was passed through a one-inch thick mass of the "Grade 20" porous carbon referred to above, and was then permitted to stand for an hour. There was no separation of the constituents of the emulsion into layers, although the water was visible as aggregates of fine globules suspended in the oil.

A second sample of the emulsion was passed over the surface of a solid carbon disc charged with alternating current at about 25,000 volts. After settling for about an hour, this second sample separated into three layers, a water layer containing about 5% of the water, an oil layer, and a water-rich sludge layer. A 10 c. c. sample of the oil layer when centrifuged yielded 9.3 c. c. of oil and 0.7 c. c. of water-rich emulsion. A 10 c. c. sample of the sludge layer when centrifuged yielded 5.4 c. c. of oil and 4.6 c. c. of water-rich emulsion.

The third sample of emulsion was passed through a one-inch thick plate of "Grade 20" porous carbon to which was applied an alternating electric current at 25,000 volts. The effluent was allowed to settle for about 35 minutes. Of the water originally in the emulsion, 80% settled out as a clear water layer. A 10 c. c. sample of the oil-rich layer, when centrifuged, yielded 9.8 c. c. of oil and only 0.2 c. c. of an emulsion. A 10 c. c. sample of the emulsion between the clear water and the oil, when centrifuged, yielded 7.1 c. c. of oil and 2.9 c. c. of emulsion.

Although the foregoing description has emphasized the treatment of emulsions of fresh or salt water in crude petroleum, the invention is applicable to the resolution of emulsions generally.

My copending application, Serial No. 358,086, filed September 24, 1940, describes and claims a related emulsion resolving method.

It will be apparent that such expedients as the addition of chemicals to the emulsion may be used in conjunction with the method of the invention, but it will not ordinarily be found necessary to use such expedients. Preheating of the oil will sometimes be advantageous to decrease its viscosity and, incidentally, to assist somewhat the breaking of the emulsion.

I claim:

1. The method of resolving an emulsion of water in oil which comprises passing the emulsion through the pores of a porous mass of electrically conductive material and impressing a high electrical potential between said porous mass and another electrode; said porous mass containing a multitude of small, tortuous passages which are very long in relation to their diameters and are interconnected in all directions.

2. The method of resolving an emulsion of water in oil which comprises passing the emulsion of water and oil through the pores of a porous mass of carbon and impressing an electrical potential of at least 5000 volts between said porous mass and another electrode, said porous mass containing a multitude of small, tortuous passages having lengths very large in relation to their diameters.

3. The method of resolving an emulsion of water in petroleum which comprises passing said emulsion through the pores of a uniformly, finely porous agglomerated mass of graphite, and impressing an electrical potential of at least 5000 volts between said graphite and another electrode, said porous mass containing a multitude of small, tortuous passages having lengths very large in relation to their diameters.

4. The method of resolving an emulsion of water in crude petroleum containing suspended finely divided solids which comprises passing said emulsion through the pores of a uniformly, finely porous agglomerated mass of graphite approximately one inch thick, the majority of the pores of which are sufficiently large to pass said suspended solids; and impressing an electrical potential of at least 5000 volts between said graphite and another electrode; and separating the constituents of the effluent by settling.

5. In a method of resolving an emulsion of water in oil by passing the same through a porous contact mass, the improvement which comprises forcing the emulsion through the pores of a mass of sized solid carbon particles bonded with porous carbon, in the form of a rigid, self-supporting mass in which the pores are interconnected in all directions whereby channeling of said emulsion through said mass and contamination of said emulsion with said mass are avoided; impressing an electric potential upwards of 5000 volts between said mass and another electrode; and thereafter separating the immiscible constituents of the emulsion by gravity settling.

MARCUS R. HATFIELD.